Patented Dec. 4, 1951

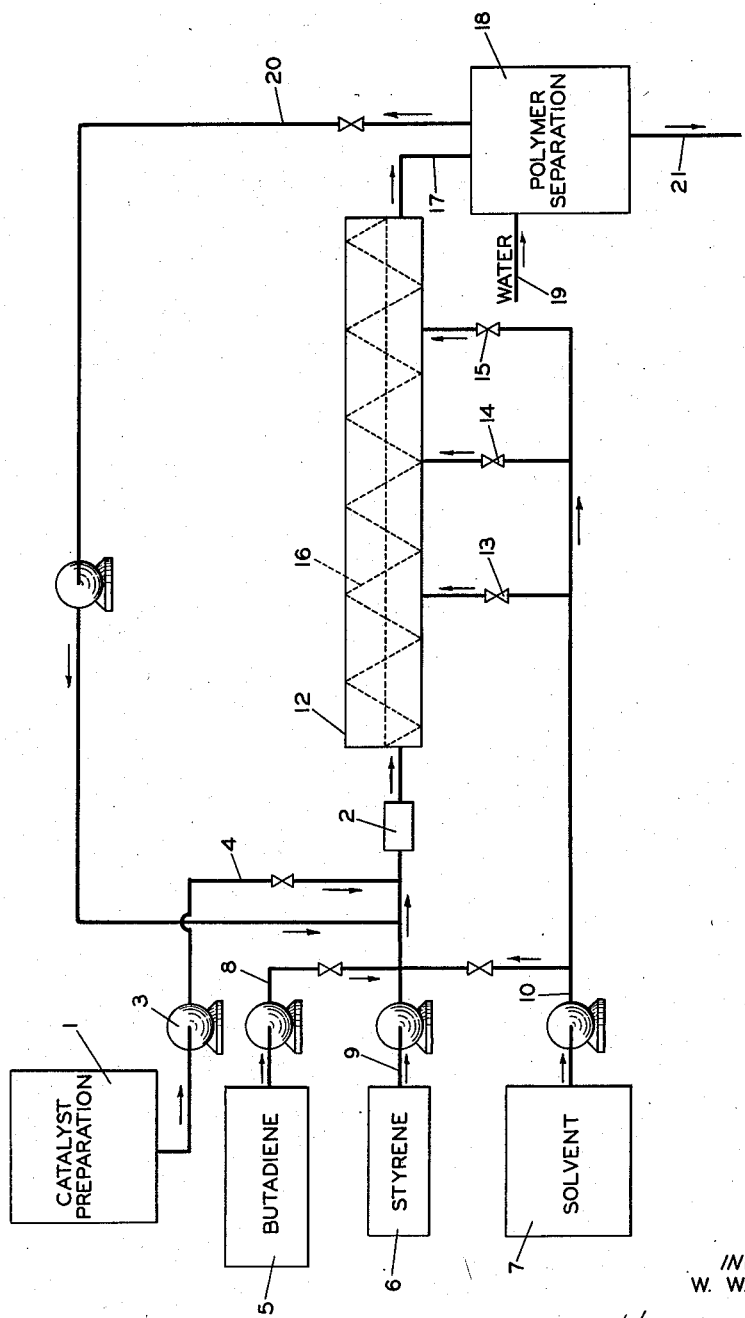

2,577,677

UNITED STATES PATENT OFFICE 2,577,677

SOLUTION POLYMERIZATION

Willie W. Crouch, Bartlesville, Okla., assignor to Phillips Petroleum Company, a corporation of Delaware Application December 24, 1946, Serial No. 718,184

5 Claims. (Cl. 260—83.7)

This invention relates to the polymerization of polymerizable organic compounds to high polymers. In one of its more specific aspects it relates to the copolymerization of butadiene and styrene in a homogeneous system. The present invention is particularly applicable to mass polymerization, i. e. polymerization in an unemulsified liquid mixture, of unsaturated organic compounds which are capable of undergoing addition reactions to form long chain polymers known in the art as high polymers.

It is known that a number of organic compounds containing a terminal $CH_2=C<$ group are capable of undergoing addition reactions to form high polymers. These compounds may be polymerized either alone or with other unsaturated compounds. Among the compounds suitable for this purpose, the following may be mentioned as examples: conjugated diolefins (e. g., 1,3-butadiene, isoprene, 2,3-dimethylbutadiene, piperylene); aryl olefins (e. g., styrene, p-chlorostyrene, p-methoxystyrene, vinylnaphthalene, etc.); vinylfuran, vinylpyridine, vinylthiophene, vinylquinoline, and the like; alkyl esters of acrylic acid (e. g. methyl acrylate, ethyl acrylate, butyl acrylate, etc.); esters of substituted acrylates (e. g., methyl methacrylate, ethyl methacrylate, butyl methacrylate, methyl ethacrylate, etc.); nitriles of acrylic acids (e. g., acrylonitrile, methacrylonitrile, etc.); vinylidine chloride; vinyl ketones (e. g. methyl vinyl ketones); vinyl ethers (e. g. methyl vinyl ether); vinylcarbazole; and other unsaturated compounds. The present invention is particularly useful for the polymerization of a conjugated diolefin containing from four to six carbon atoms and copolymerization of a conjugated diolefin with a comonomer, such as, for example, styrene.

The present invention is concerned with the mass polymerization of polymerizable organic compounds in the presence of an alkali metal catalyst. By means of this process, the polymerization may be carried out continuously to produce polymers of high quality and uniform properties. In particular, the process is useful for the production of polymers of low viscosity suitable for use as adhesives and as plasticizers for general purpose synthetic rubber.

An object of this invention is to provide an improved process for the production of high polymers. Another object is to provide an improved process for the polymerization of conjugated diolefins in the presence of an alkali metal catalyst. Still another object is to provide an improved process for the polymerization of conjugated diolefins in an unemulsified liquid mixture in the presence of a finely divided alkali metal. A further object is to provide such a process wherein the polymerization may be carried out continuously. Other objects and advantages of this invention will be apparent to those skilled from the accompanying detailed description of my invention.

The accompanying figure is a diagrammatic illustration of a specific embodiment of my invention as applied to continuous polymerization of butadiene and styrene to produce a low viscosity copolymer.

While the mass polymerization of conjugated diolefins, either per se, or in combination with other polymerizable organic compounds, results in polymers of high elasticity which have many properties resembling natural gum rubber, certain difficulties attendant upon this type of polymerization have made the process unattractive and have retarded its development on a commercial basis. One of the major problems which has confronted the development of mass polymerization has been that of obtaining a suitable method of catalysis whereby a uniform reaction rate can be secured throughout the mixture during the entire course of the polymerization. One method of operation which has shown considerable promise is that of supplying an alkali metal catalyst to the reaction in the form of a suspension or slurry in which the metal is dispersed in finely divided form in a suitable inert medium. However, as the reaction proceeds, the catalyst particles are progressively removed from active participation in the reaction by their being segregated in masses or agglomerates of polymeric material formed on surfaces within the reactor with the resultant production of non-homogeneous polymers.

I have now discovered a method for mass polymerization of conjugated diolefins either alone or with other polymerizable organic compounds, wherein homogeneous polymer products of preferred quality are obtained by maintaining solution of the polymer in a solvent, such as, for example, benzene. By the method of my invention the polymer, being dissolved as formed, leaves the catalyst particles dispersed and thus facilitates the continuation of the reaction in a uniform manner. Polymers produced by this process are removed from the reactor as a relatively viscous fluid which upon removal of the solvent and catalyst by suitable means yield a homogeneous product.

The present invention is particularly concerned with polymerization of polymerizable organic compounds containing a terminal $CH_2=C<$ group in the presence of a finely divided alkali metal catalyst and a liquid polymer solvent miscible with the monomer. Sufficient solvent is employed to maintain the mixture in a homogeneous solution throughout the reaction. This prevents the formation of polymeric masses which tend to agglomerate and insulate the catalyst particles in conventional mass polymerization with metal catalysts. Homogeneous polymers of uniform quality are produced by the process of my invention wherein the catalyst action is maintained at a uniform level by solution of the polymer as rapidly as it is formed.

I am aware of the fact that diluents, including benzene, have been used heretofore in the mass polymerization of diolefins. However, in carrying out mass polymerization reactions, I found that the quantity of solvent which may be added to the monomer is definitely limited by the inhibiting effect on the polymerization reaction. The permissible quantity is not sufficient to dissolve the polymer as it is formed. Contrary to expectations, I found that additional amounts of the solvent may be added to the mixture as the polymerization progresses, with little effect on the rate of the polymerization reaction, even though the concentration of the monomer, due to polymerization and dilution, is progressively diminished. Not more than about 100 parts solvent per 100 parts (by weight) monomer is used in the preparation of the initial solution. During the polymerization, additional solvent may be added up to 1000 parts or more.

In a general embodiment, my invention comprises a process for carrying out the alkali metal catalyzed polymerization of diolefins or copolymerization of diolefins with other monomers, such as styrene, in the presence of an inert solvent, such as benzene, capable of maintaining the polymer in solution. The catalysts employed for the reaction comprise finely divided alkali metals dispersed in an inert medium, such as for example, xylene. The dispersion of such catalysts may be effected and stabilized by means of surface active agents; such dispersions are completely described in my copending applications, Serial Nos. 671,899 and 671,900, filed May 23, 1946, now Patents 2,483,886 and 2,483,887, issued October 4, 1949.

In the operation of my process provision is made for controlled introduction of catalyst suspension, monomers and solvent. The catalyst suspension and the monomers are initially admixed with a given proportion of solvent, less than the amount required for solution of all of the polymer, and additional solvent added during the course of the polymerization reaction. The process may be carried out either batch-wise or continuously. In the batch-wise polymerization the polymerization of the initial mixture is allowed to proceed until the solution becomes relatively viscous. Additional solvent is then added and the polymerization continued until the viscosity of the mixture has again increased. Several additions of solvent may be made as the polymerization proceeds.

Initially the quantity of solvent admixed with the catalyst and monomers is relatively small, within the range of from about 40 to about 100 parts of solvent per 100 parts of monomers. The monomers, for example, butadiene and styrene, at the onset of the reaction are miscible with each other and with the solvent, therefore, a small amount of solvent insures a sufficient contact of the reactants and also suffices to dissolve the initial polymers formed. It is possible to initiate the polymerization without the addition of solvent and to add solvent when a separate polymer phase starts to form. In accordance with this invention additional quantities of solvent are added intermittently throughout the process as the polymer product is formed. The second and third additions of solvent may be in quantities within the range of 100 to 200 parts of solvent per 100 parts of monomer; when the reaction is near completion as much as 300 to 500 parts of solvent may be added. In this way the polymer is dissolved concurrently with its formation throughout the process and the polymerization reaction proceeds at a more nearly uniform rate due to the effective dispersion of the reactants and catalyst. When it is desired to produce low viscosity polymers as by carrying out the reaction at relatively high temperatures or in the presence of relatively large amounts of catalysts or modifiers, for example dioxane or vinyl chloride, relatively small amounts of solvent, for example 50 to 100 parts, are required.

In a specific embodiment of the present invention wherein the polymerization is carried out continuously, a relatively long tube reactor is used. The reactor is equipped with a conveyor worm and inlets for the reactants, solvent and catalyst suitably spaced along the length of the tube. The initial charge is introduced at one end of the tube and the polymer products withdrawn from the other end. At spaced points along the tube, inlets for solvent are provided. At the initial inlet the catalyst, monomers and a small quantity of solvent, thoroughly admixed, are introduced. Additional solvent is then injected into the tube at various points as the mixture is carried along by the worm and in this way the viscosity is continuously controlled and a homogeneous solution maintained.

The polymer solution withdrawn from the reactor is fed to a polymer separation system where the solvent and unreacted monomers are removed and recycled to the reactor. This may be accomplished, for example, by spraying the solution into a chamber and flashing off the solvent. In this case, the resulting polymer may subsequently be washed with water on a wash mill to destroy the catalyst and leave the polymer ready for processing.

As an alternative method, the solution may be extruded as filaments, or the like, into hot water wherein the solvent is vaporized and the alkali metal catalyst is destroyed.

In order to illustrate a specific embodiment of the process of this invention reference is made to the accompanying drawing. In this explanation reference is made to specific comonomers and also to a specific design and arrangement of equipment. It is to be understood, however, that variations in both materials and equipment may be made without departing from the scope of the disclosure.

A finely divided suspension of alkali metal catalyst, for example, sodium in xylene, from the catalyst preparation vessel 1, is introduced into a mixer 2 by means of a pump 3 and line 4. Simultaneously butadiene from storage tank 5, styrene from tank 6 and benzene solvent from tank 7 are fed through lines 8, 9, and 10, respectively, into mixer 2 and introduced into reactor 12. Solvent from line 10 is introduced into the reactor at various points as polymerization occurs and the reaction mass becomes more viscous. The continuous addition of benzene from line 10 is controlled by valves 13, 14, and 15, respectively, and is made in such a manner that the solution is maintained at high concentration, yet so that there is no undissolved polymer. Polymerization occurs in reactor 12 and the viscous polymer solution is propelled through the reactor by means of a screw type conveyer 16 with incremental addition of benzene maintaining the mobility of the mass.

The polymer solution passes from the reactor 12 via line 17 into a polymer separation unit 18 where the benzene and unreacted monomers are removed by treatment with boiling water introduced through line 19, recycled after separation of water via line 20 to the mixer 2, and returned to the reactor together with controlled proportions of the butadiene, styrene and benzene from their respective storage tanks. The polymer crumb is removed with water, through line 21 and after separation from the water, as by filtration, is ready for further processing.

Butadiene and styrene are polymerized in accordance with this invention. The following recipe is used in preparing the initial reaction solution.

| | Parts by weight |
|---|---|
| Butadiene | 75 |
| Styrene | 25 |
| Sodium | 0.30 |
| Benzene | 100 |

The charge is agitated at 30° C. for 10.5 hours at which time the solution is quite viscous. An additional 200 parts of benzene is added to the solution and at the end of 16 hours polymerization time 200 parts benzene is added. Polymerization is continued for a total polymerization time of 22 hours. At the end of 22 hours the solution is free-flowing and homogeneous. The polymer is precipitated from the solution by the addition of methanol, 2 per cent of an antioxidant (phenyl-beta-naphthylamine) milled in, and oven-dried at 150° F. The polymers are free of benzene-insoluble gel. The following data were obtained from two representative runs.

| Run No. | Per Cent Conversion | Intrinsic Viscosity |
|---|---|---|
| 1 | 81.1 | 3.97 |
| 2 | 84.6 | 3.68 |

From the foregoing discussion it is obvious that variations in the process may be employed without departing from the principle of the invention. For example, in place of using a single reaction zone as described, a series of reaction zones may be employed with additional solvent supplied to each reactor. The amount of solvent is increased in sequence and the polymer solution may be passed from one reaction zone to the next as the polymerization reaction progresses.

The maintenance of a free flowing solution throughout the process provides an excellent basis for a continuous process for polymerization reactions. However, the process may be carried out in a batch-wise operation with the addition of benzene intermittently in increasing amounts to the reaction mixture.

The solvents suitable for use in this invention are inert materials, such as the aromatic hydrocarbons, capable of dissolving rubber or rubber-like polymers. Benzene is most generally preferred in butadiene-styrene systems or in other butadiene-comonomer systems. Other aromatic hydrocarbons that may be employed are, for example, toluene, xylene, ethyl benzene, and the like.

The metal catalysts applicable in this process are the alkali metals. For economic reasons sodium and potassium are most generally used with sodium usually preferred. The amount of catalyst may be varied within certain limits but it usually lies within the range of 0.1 to 1.0 part per 100 parts of monomers.

The polymerization temperature is usually held within the range of 20 to 60° C. and the reaction time varies considerably with the particular polymerization system, reactants, temperature, the effectiveness of contact of the reactants with the catalyst, and the like. The factors may be satisfactorily controlled when the process described herein is employed for carrying out polymerization reactions.

I claim:

1. In a process for the polymerization of a monomer mixture comprising a major portion of 1,3-butadiene and a minor portion of styrene in the presence of finely divided metallic sodium as polymerization catalyst, the improvement which comprises dissolving said monomers in 40 to 100 parts of liquid benzene, continuously passing a resulting solution in admixture with a finely divided sodium catalyst through a polymerization zone under polymerization conditions, adding at an intermediate point along the length of said polymerization zone additional liquid benzene in an amount between 100 and 200 parts, adding at a subsequent point along the length of said zone an additional quantity of liquid benzene in an amount between 100 and 500 parts, all parts being parts by weight per 100 parts by weight of said monomer mixture, continuously passing from said polymerization zone a solution of resulting polymeric synthetic rubber in benzene so produced, admixing water with said solution and recovering from said solution a synthetic rubber as a product of the process.

2. In a process for the polymerization of a monomer mixture comprising a major portion of 1,3-butadiene and a minor portion of styrene in the presence of finely divided metallic sodium as polymerization catalyst, the improvement which comprises dissolving said monomers in 40 to 100 parts of liquid benzene, passing a resulting solution in admixture with a finely divided sodium catalyst into a polymerization zone under polymerization conditions, adding to said polymerization zone at least once during the course of the polymerization additional liquid benzene in an amount between 100 and 200 parts, all parts being parts by weight per 100 parts by weight of said monomer mixture, passing from said polymerization zone a solution of resulting polymeric synthetic rubber in benzene so produced, and recovering from said solution a synthetic rubber as a product of the process.

3. In a process for the polymerization of a conjugated diolefin in the presence of a finely divided alkali metal as polymerization catalyst, the improvement which comprises dissolving said conjugated diolefin in 40 to 100 parts of liquid aromatic hydrocarbon, passing a resulting solution in admixture with a finely divided alkali metal catalyst into a polymerization zone under polymerization conditions, adding to said polymerization zone at least once during the course of the polymerization additional liquid aromatic hydrocarbon in an amount between 100 and 200 parts, all parts being parts by weight per 100 parts by weight of said conjugated diolefin, passing from said polymerization zone a solution of resulting polymer in said aromatic hydrocarbon so produced, and recovering from said solution a resulting polymer as a product of the process.

4. The process of claim 3 wherein 1,3-butadiene is polymerized in the presence of finely divided sodium catalyst at a polymerization temperature between 20 and 60° C.

5. In the polymerization of an organic compound containing a terminal $CH_2=C<$ group and capable of undergoing addition to form high polymers in the presence of an alkali metal, the improvement which comprises dissolving said compound in 40 to 100 parts of liquid aromatic hydrocarbon, passing a resulting solution in admixture with a finely divided alkali metal catalyst into a polymerization zone under polymerization conditions, adding to said polymerization zone at least once during the course of the polymerization additional liquid aromatic hydrocarbon in an amount between 100 and 200 parts, all parts being parts by weight per 100 parts by weight of said conjugated diolefin, passing from said polymerization zone a solution of resulting polymer in said aromatic hydrocarbon so produced, and recovering from said solution a resulting polymer as a product of the process.

WILLIE W. CROUCH.

REFERENCES CITED

The following references are of record in the file of this patent:

UNITED STATES PATENTS

| Number | Name | Date |
| --- | --- | --- |
| 1,827,285 | Ebert | Oct. 13, 1931 |
| 2,087,468 | Chalmers | July 20, 1937 |
| 2,209,746 | Ebert | July 30, 1940 |
| 2,264,811 | Rothrock | Dec. 2, 1941 |
| 2,283,539 | Collings et al. | May 19, 1942 |